US012511656B1

(12) United States Patent
Rapowitz et al.

(10) Patent No.: US 12,511,656 B1
(45) Date of Patent: *Dec. 30, 2025

(54) EXCLUDING FRAUDULENT TRANSACTIONS IN TRANSACTION BASED AUTHENTICATION

(71) Applicant: Capital One Services, LLC, McLean, VA (US)

(72) Inventors: Samuel Rapowitz, Roswell, GA (US); Viraj Chaudhary, Katy, TX (US); Joshua Edwards, Philadelphia, PA (US); David Septimus, New York, NY (US); Tyler Maiman, Melville, NY (US); Daniel Miller, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/760,623

(22) Filed: Jul. 1, 2024

Related U.S. Application Data

(63) Continuation of application No. 17/682,502, filed on Feb. 28, 2022, now Pat. No. 12,056,221.

(51) Int. Cl.
*G06Q 20/40* (2012.01)
(52) U.S. Cl.
CPC .............................. *G06Q 20/4016* (2013.01)
(58) Field of Classification Search
CPC ................................................ G06Q 20/4016
See application file for complete search history.

(56) References Cited

U.S. PATENT DOCUMENTS

| 10,255,558 | B1 | 4/2019 | Kronrod et al. | |
| 10,755,281 | B1* | 8/2020 | Yip | G06Q 20/4016 |
| 2009/0106134 | A1 | 4/2009 | Royyuru | |
| 2019/0385170 | A1* | 12/2019 | Arrabothu | G06N 3/08 |
| 2020/0382327 | A1 | 12/2020 | Mokhasi et al. | |
| 2021/0312035 | A1* | 10/2021 | Semichev | G06F 21/52 |

OTHER PUBLICATIONS

Hearn, Charles, "Answering My Own Authentication Questions Prove That They're Useless," Aug. 29, 2018, retrieved from: https://alloy.co/blog/answering-my-own-authentication-questions-prove-that-theyre-usless [Jun. 7, 2021 2:44:10 PM], pp. 1-8.

(Continued)

*Primary Examiner* — Bryan Y Lee
(74) *Attorney, Agent, or Firm* — Banner & Witcoff, Ltd.

(57) ABSTRACT

Methods, systems, and apparatuses are described herein for improving computer authentication processes through excluding fraudulent transactions in transaction-based authentication. A computing device may receive a request for access to an account from a user. The computing device may provide transaction data to a machine learning model. The computing device may receive data indicating a confidence threshold associated with the user from the machine learning model. The computing device may generate a modified set of merchant choices for the user by excluding merchants related to potentially fraudulent transactions within a predetermined time period. An authentication question may be generated, and access to the account may be provided based on a response to the authentication question.

20 Claims, 7 Drawing Sheets

(56) References Cited

OTHER PUBLICATIONS

Baukes, Mike, "Everybody Knows: How Knowledge-Based Authentication Died," Forbes Technology Councel, 22 Jan., 2018, retrieved from: https://www.forbes.com/sites/forebestechcouncil/2018/01/22/everybody-know-how-knowledge-based-authentication-died/?sh=4441a6c94eee[Jun. 7, 2021 2:41:51 PM], pp. 1-5.
Cole, Bryan, "Dynamic KBA—The Best Security Questions," retrieved from: https://www.identropy.com/blog/iam-blog/bid/110793/dynamic-kba-the-best-security-questions [Jun. 7, 2021 2:39:34 PM], pp. 1-4.
"Dynamic Knowledge-Based Authentication Asks Customers Out-of-Wallet Questions to Verify Identity & Deter Cybersecurity Fraud," Idology, a GBC Company, retrieved from: https://www.idology.com/dynamic-kba [Jun. 7, 2021 2:36:41 PM], pp. 1-9.
Dwivedi, Prasoon, et al., "Challenges and Best Practices in KBA Schemes," EMC Proven Professional Knowledge Sharing, 2015. pp. 1-17.
Jul. 12, 2023—(WO) International Search Report and Written Opinion—App No. PCT/US2023/012661.

\* cited by examiner

Merchants Choices From Last Month:

ABC Grocery
Captain Seafood
Spirit Liquor
SuperH Market

Initial Merchant Choices
(601)

Modified Merchant Choices From Last Month:

ABC Grocery
Captain Seafood
SuperH Market

Modified False Merchant Choices
(602)

FIG. 6A

EXCLUDING FRAUDULENT TRANSACTIONS IN TRANSACTION BASED AUTHENTICATION

CROSS-REFERENCE TO RELATED APPLICATIONS

This application is a continuation of and claims priority to co-pending U.S. patent application Ser. No. 17/682,502 filed Feb. 28, 2022, and titled "Excluding Fraudulent Transactions in Transaction Based Authentication," the contents of which are hereby incorporated by reference in its entirety.

FIELD OF USE

Aspects of the disclosure relate generally to computer authentication. More specifically, aspects of the disclosure may provide for improvements in the method in which authentication questions are generated by computing devices by processing transaction and merchant information.

BACKGROUND

As part of determining whether to grant a user access to content (e.g., as part of determining whether to provide a caller access to a telephone system that provides banking information), a user of the user device may be prompted with one or more authentication questions. Such questions may relate to, for example, a password of the user, a personal identification number (PIN) of the user, or the like. Those questions may additionally and/or alternatively be generated based on personal information of the user. For example, when setting up an account, a user may provide a variety of answers to predetermined questions (e.g., "Where was your father born?," "Who was your best friend in high school?"), and those questions may be presented to the user as part of an authentication process. As another example, a commercially-available database of personal information may be queried to determine personal information for a user (e.g., their birthdate, birth location, etc.), and that information may be used to generate an authentication question (e.g., "Where were you born, and in what year?"). A potential downside of these types of authentication questions is that the correct answers may be obtainable and/or guessable for someone who has information about a particular user.

As part of authenticating a computing device, information about financial transactions conducted by a user of that computing device may be used to generate authentication questions as well. For example, a user may be asked questions about one or more transactions conducted by the user in the past (e.g., "Where did you get coffee yesterday?," "How much did you spend on coffee yesterday?," or the like). Such questions may prompt a user to provide a textual answer (e.g., by inputting an answer in a text field), to select one of a plurality of answers (e.g., select a single correct answer from a plurality of candidate answers), or the like. In some instances, the user may be asked about transactions that they did not conduct. For example, a computing device may generate a synthetic transaction (that is, a fake transaction that was never conducted by a user), and ask a user to confirm whether or not they conducted that transaction. Authentication questions can be significantly more useful when they can be based on either real transactions or synthetic transactions: after all, if every question related to a real transaction, a nefarious user could use personal knowledge of a legitimate user to guess the answer, and/or the nefarious user may be able to glean personal information about the legitimate user.

One issue with transaction-based authentication questions is that they might relate to fraudulent transactions that are not particularly memorable to a user or are confusing for a user. This may particularly be the case for fraudulent transactions that, although they appear on a user's transaction record, may have never in fact been conducted by that user. For example, users might not consume or use products related to fraudulent transactions carried out by the imposters, such that the users might not be able to easily and/or accurately answer authentication questions based on those fraudulent transactions. This may particularly be the case for transactions that were not initially captured by the fraud detection algorithm, but later reported by the users as fraudulent. As such, an authorization process may become frustrating and time-consuming for a user and waste significant amounts of computing resources.

Aspects described herein may address these and other problems, and generally enable a user to be verified in a more reliable and robust manner, thereby improving the safety of financial accounts and computer transaction systems and the user experience during the authentication process.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are used to control access to accounts. The improvements described herein relate to excluding fraudulent transactions from being presented to a user in an authentication question including one or more merchant choices. For example, if an imposter ordered a meal from a pizzeria using a legitimate user's card, the legitimate user might not recall that she ever had transacted with the pizzeria. Including the name of the pizzeria in the authentication questions and asking the user to identify a merchant choice based on her own transaction history may cause confusion and frustrate a legitimate user from accessing her account. Conversely, excluding such fraudulent transactions may increase memorability, promote account accessibility to the users, and better protect their accounts from unauthorized access. As will be described in greater detail below, this process is effectuated by determining a confidence threshold for a particular user using a machine learning model, which may be trained using transaction records related to numerous users. Based on a fraudulent transaction confidence score related to a transaction satisfying the confidence threshold, the corresponding transaction may be identified as potentially fraudulent. A set of modified merchant choices may be generated for the particular user by excluding certain merchants related to the potentially fraudulent transactions. As such, the modified set of merchant choices may be presented in an authentication question to minimize confusions and increase account accessibilities in the user community.

More particularly, and as will be described further herein, a computing device may receive, from a user device, a request for access to a first account associated with a first user. The computing device may receive, from one or more databases, first transaction data corresponding to the first account. The first transaction data may indicate one or more transactions conducted by the first user. The computing device may receive, from the one or more databases, one or more fraudulent transaction confidence scores associated with the first account. Each fraudulent transaction confidence score may indicate a degree of confidence, by a fraud detection algorithm, that a particular transaction was fraudulent. The computing device may train, based on a history of transaction records, a machine learning model to determine recommended confidence thresholds. The history of transaction records may indicate transactions conducted by a plurality of different users, and each transaction indicated by the history of transaction records may be associated with a predetermined fraudulent transaction confidence score. The computing device may provide, as input to a trained machine learning model, input data comprising the first transaction data and the one or more fraudulent transaction confidence scores. The computing device may receive, as output from the trained machine learning model, data indicating a confidence threshold associated with the first user. The computing device may determine, based on the first transaction data and based on the confidence threshold, one or more merchant choices, and each of the one or more merchant choices is associated with a corresponding fraudulent transaction confidence score that satisfies the confidence threshold. The computing device may generate, based on the first transaction data, a set of modified merchant choices by excluding the one or more merchant choices. The computing device may generate an authentication question comprising at least one merchant choice from the set of modified merchant choices. Based on the first transaction data and the set of modified merchant choices, the computing device may generate a correct answer to the authentication question and provide the authentication question to the user device. The computing device may receive, from the user device, a response to the authentication question. Accordingly, the computing device may grant the user device access to the first account based on comparing the response to the authentication question to the correct answer.

The computing device may receive user feedback information indicating whether one or more transactions in the first transaction data are indeed fraudulent. The computing device may use the trained machine learning model to modify the confidence threshold associated with the first user based on the user feedback information. For example, the computing device may provide, as input to a trained machine learning model, input data comprises a user spending pattern including one or more of: a number of purchases made by the first user, a number of merchants associated with the first user, or one or more types of merchants associated with the first user. The input data may also include one or more time periods associated with one or more transactions in the first transaction data.

The computing device may determine, using a second trained machine learning model different from the trained machine learning model, the one or more fraudulent transaction confidence scores. The second trained machine learning model may be trained to output fraudulent transaction confidence scores using second training data that comprises a history of fraudulent transaction confidence scores corresponding to a history of different transactions. The second trained machine learning model may include an unsupervised model, and the trained machine learning model may include a supervised model. The confidence threshold may be lower than a generic confidence threshold applied to one or more different accounts. The set of modified merchant choices may include merchants that the first user has transacted with in a predetermined period of time. The set of modified merchant choices may also include false merchants that the first user has not transacted with in a predetermined period of time.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6A illustrates illustrative merchant choices; and

DETAILED DESCRIPTION

Figure 1:
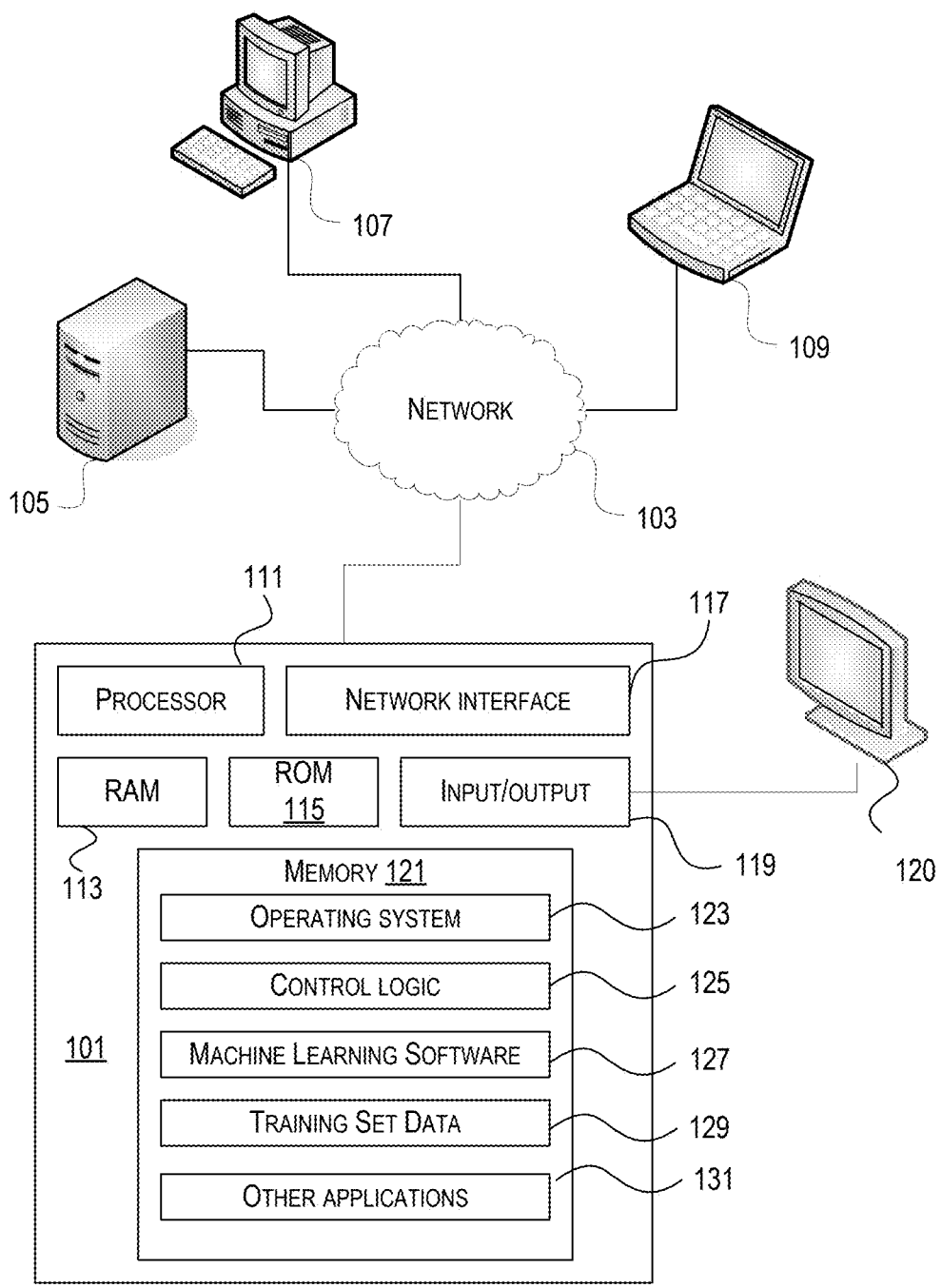
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving authentication questions used during an authentication process. In particular, the process depicted herein may determine a set of merchant choices related to a user's transaction history. Certain merchants may be excluded to generate a modified set of merchant choices, because such merchants may appear in transactions that might be potentially fraudulent. A confidence threshold tailored for the user may be determined to exclude potentially fraudulent transactions. In this manner, authentication questions might be generated using the modified set of merchant choices and presented in a manner which does not undesirably confuse a user. For example, the modified set of merchant choices might not include any merchants that is related to potentially fraudulent transactions in a predetermined period of time. The potentially fraudulent transaction might be conducted by an imposter rather than a legitimate user, and appear in the user's transaction history. A legitimate user might not have a memory of using a product or service procured from the merchants that related to the potentially fraudulent transactions. Including such merchants in the authentication question might make it difficult for a legitimate user to identify them as true or false merchants. Conversely, excluding these potential confusing merchants may increase accessibility and promote security on the user accounts.

More particularly, some aspects described herein may provide for a computing device that receives, from a user device, a request for access to a first account associated with a first user. The computing device may receive, from one or more databases, first transaction data corresponding to the first account. The first transaction data may indicate one or more transactions conducted by the first user. The computing device may receive, from the one or more databases, one or more fraudulent transaction confidence scores associated with the first account. Each fraudulent transaction confidence score may indicate a degree of confidence, by a fraud detection algorithm, that a particular transaction was fraudulent. The computing device may train, based on a history of transaction records, a machine learning model to determine recommended confidence thresholds. The history of transaction records may indicate transactions conducted by a plurality of different users, and each transaction indicated by the history of transaction records may be associated with a predetermined fraudulent transaction confidence score. The computing device may provide, as input to a trained machine learning model, input data comprising the first transaction data and the one or more fraudulent transaction confidence scores. The computing device may receive, as output from the trained machine learning model, data indicating a confidence threshold associated with the first user. The computing device may determine, based on the first transaction data and based on the confidence threshold, one or more merchant choices, and each of the one or more merchant choices is associated with a corresponding fraudulent transaction confidence score that satisfies the confidence threshold. The computing device may generate, based on the first transaction data, a set of modified merchant choices by excluding the one or more merchant choices. The computing device may generate an authentication question comprising at least one merchant choice from the set of modified merchant choices. Based on the first transaction data and the set of modified merchant choices, the computing device may generate a correct answer to the authentication question and provide the authentication question to the user device. The computing device may receive, from the user device, a response to the authentication question. Accordingly, the computing device may grant the user device access to the first account based on comparing the response to the authentication question to the correct answer.

The computing device may receive user feedback information indicating whether one or more transactions in the first transaction data are fraudulent. The computing device may use the user feedback information to train a machine learning model to modify the confidence threshold associated with the first user. For example, the computing device may provide, as input to a machine learning model, input data comprising whether one or more transactions are fraudulent based on the user feedback information and the corresponding fraudulent transaction confidence scores. The computing device may output the confidence threshold associated with the user such that each of the fraudulent transaction may have the corresponding fraudulent transaction confidence score satisfying this confidence threshold, and each of the non-fraudulent transaction may have the corresponding fraudulent transaction confidence score falling below this confidence threshold.

The computing device may determine, using a second trained machine learning model different from the trained machine learning model, the one or more fraudulent transaction confidence scores. The second trained machine learning model may be trained to output fraudulent transaction confidence scores using second training data that comprises a history of fraudulent transaction confidence scores corresponding to a history of different transactions. The second trained machine learning model may include an unsupervised model, and the trained machine learning model may include a supervised model.

The confidence threshold associated with a specific user may be lower than a generic confidence threshold applied to one or more different accounts. The computing device may determine one or more merchant choices in the transactions with corresponding fraudulent transaction confidence scores satisfying the confidence threshold. The computing device may generate a set of modified merchant choices by excluding the one or more merchant choices. The set of modified merchant choices may include merchants that the first user has transacted with in a predetermined period of time. The set of modified merchant choices may also include false merchants that the first user has not transacted with in a predetermined period of time.

Aspects described herein improve the functioning of computers by improving the accuracy and security of computer-implemented authentication processes. The steps described herein recite improvements to computer-implemented authentication processes, and in particular improve the accuracy and utility of authentication questions used to provide access to computing resources. This is a problem specific to computer-implemented authentication processes, and the processes described herein could not be performed in the human mind (and/or, e.g., with pen and paper). For example, as will be described in further detail below, the processes described herein rely on the processing of transaction data, the dynamic computer-implemented generation of authentication questions, and the use of various machine learning models.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
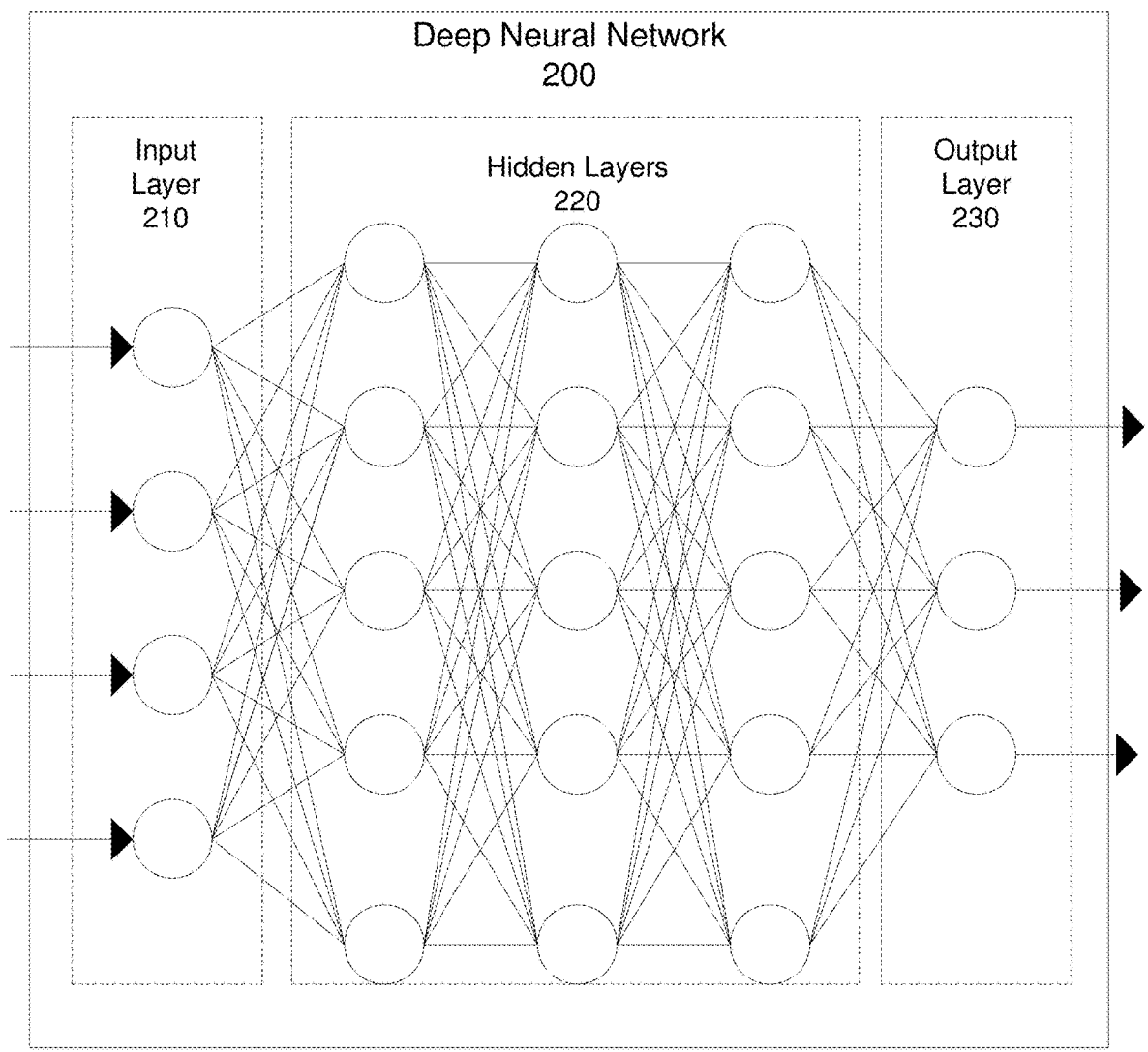
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
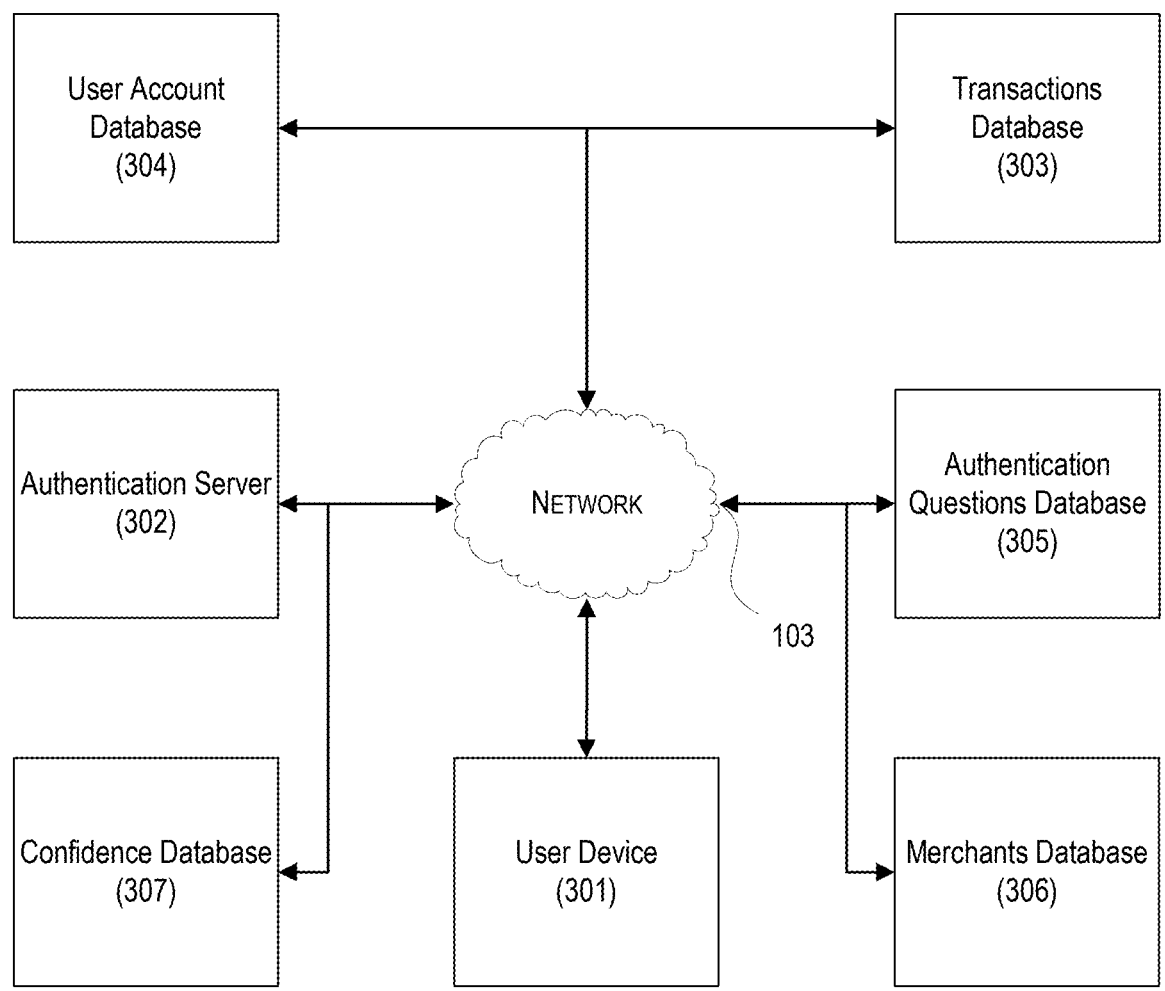
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user account database 304, an authentication questions database 305, a merchants database 306 and a confidence database 307. The network 103 may be the same or similar as the network 103 of FIG. 1. Each of the user device 301, the authentication server 302, the transactions database 303, the user account database 304, the authentication questions database 305, the merchants database 306, and/or the confidence database 307 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

As part of an authentication process, the user device 301 might communicate, via the network 103, to access the authentication server 302 to request access (e.g., to a user account). The user device 301 shown here might be a smartphone, laptop, or the like, and the nature of the communications between the two might be via the Internet, a phone call, or the like. For example, the user device 301 might access a website associated with the authentication server 302, and the user device 301 might provide (e.g., over the Internet and by filling out an online form) candidate authentication credentials to that website. The authentication server 302 may then determine whether the authentication credentials are valid. For example, the authentication server 302 might compare the candidate authentication credentials received from the user device 301 with authentication credentials stored by the user account database 304. In the case where the communication is telephonic, the user device 301 need not be a computing device, but might be, e.g., a conventional telephone.

The user account database 304 may store information about one or more user accounts, such as a username, password, a billing address, an emergency contact, a phone number, other demographic data about a user of the account, or the like. For example, as part of creating an account, a user might provide a username, a password, and/or one or more answers to predetermined authentication questions (e.g., "What is the name of your childhood dog?"), and this information might be stored by the user account database 304. The authentication server 302 might use this data to generate authentication questions. The user account database 304 might store demographic data about a user, such as her age, gender, billing address, occupation, education level, income level, and/or the like.

The transactions database 303 might comprise data relating to one or more transactions conducted by one or more financial accounts associated with a first organization. For example, the transactions database 303 might maintain all or portions of a general ledger for various financial accounts associated with one or more users at a particular financial institution. The data stored by the transactions database 303 may indicate one or more merchants (e.g., where funds were spent), a transaction amount spent (e.g., in one or more currencies), a transaction date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account. The data stored by the transactions database 303 might be related to a fund transfer from a user account to a second user account. Note that the data stored by the transactions database 303 may be generated based on one or more transactions conducted by illegitimate users and such transactions might not be initially identified as fraudulent by a fraud detection algorithm. For example, an imposer might purchase an item at a store online and/or in a physical store with a stolen card from a legitimate user. The related transaction might not be identified as fraudulent until the legitimate user reported it as a fraud. In the meantime, a transaction record might be generated and stored in the transaction database 303. Using the transaction record originated from illegitimate user in the authentication questions may confuse the legitimate user and cause the legitimate user to fail the authentication. Using the transaction record originated from illegitimate user may potentially enable the imposer to gain access and jeopardize the security of the account.

The account data stored by the user account database 304 and the transactions database 303 may, but need not be related. For example, the account data stored by the user account database 304 might correspond to a user account for a bank website, whereas the financial account data stored by the transactions database 303 might be for a variety of financial accounts (e.g., credit cards, checking accounts, savings accounts) managed by the bank. As such, a single user account might provide access to one or more different financial accounts, and the accounts need not be the same. For example, a user account might be identified by a username and/or password combination, whereas a financial account might be identified using a unique number or series of characters.

The authentication questions database 305 may comprise data which enables the authentication server 302 to present authentication questions. An authentication question may be any question presented to one or more users to determine whether the user is authorized to access an account. For example, the question might be related to personal information about the user (e.g., as reflected by data stored in the user account database 304), might be related to past transactions of the user (e.g., as reflected by data stored by the transactions database 303), or the like. The authentication questions database 305 might comprise data for one or more templates which may be used to generate an authentication question based on transaction information (e.g., from the user account database 304 and/or the transactions database 303). The authentication questions database 305 might additionally and/or alternatively comprise one or more static authentication questions, such as an authentication question that is used for a wide variety of users (e.g., "What is your account number?"). An authentication question might correspond to a transaction occurred or not occurred in the past. The authentication questions database 305 might additionally and/or alternatively comprise historical authentication questions. For example, the authentication questions database 305 might comprise code that, when executed, randomly generates an authentication question, then stores that randomly-generated authentication question for use with other users.

The authentication questions stored in the authentication questions database 305 may be associated with varying levels of difficulty. Straightforward questions that should be easily answered by a user (e.g., "What is your mother's maiden name?") might be considered easy questions, whereas complicated answers that require a user to remember past transactions (e.g., "How much did you spend on coffee yesterday?") might be considered difficult questions. The authentication questions stored in the authentication questions database 305 may be associated with varying levels of memorability and guessability. Including one or more false merchant choices in the authentication questions may promote memorability, given that a legitimate user may readily identify a merchant if she does not shop at that merchant in a predetermined period of time. Excluding certain merchants corresponding to transaction conducted by illegitimate users may minimize confusion and increase the security of the user accounts.

The merchants database 306 might store data relating to one or more merchants, including the true or false merchant choices for the users. The merchants database 306 may be a merchant database that stores enterprise merchant intelligence records, which may in turn include a merchant identifier, a friendly merchant name, a zip code, a physical address, a phone number, an email or other contact information of the merchants, or a merchant category code (MCC). An MCC may be a four-digit number listed in ISO 18245 for retail financial services and used to classify a business by the types of goods or services it provides. MCCs may be assigned either by merchant type (e.g., one for hotels, one for office supply stores, etc.) or by merchant name. For example, grocery stores are classified as MCC 5411, "Grocery Stores, Supermarket," convenient stores are classified as MCC No. 5499, "MISC Food Stores-Default." The merchant records may be collected from public resources or merchant reported records.

A financial organization may build a proprietary version of the merchants database 306, for example, based on an aggregation of transaction records in transactions database 303. As a transaction arrives from a transaction stream, the corresponding transaction record may be processed, cleaned, and/or enhanced with a variety of services. For example, when a financial institution receives the transaction information in a transaction stream, the transaction information may be in the form of a line of data that offers limited information about the transaction, with each piece of information appearing in certain locations within the line of data. The merchant identifier may appear in a specific location and may include 8-10 characters in the abbreviated form, which might not be readily recognizable as a meaningful merchant name, particularly for small business merchants. The financial institution may process this abbreviated merchant identifier and convert it into a meaningful merchant name in a human readable format, and store it in the merchants database 306.

A financial organization may use a third-party API to gather merchant information, such as a merchant address or contact information, to be stored in the merchants database 306. A financial organization may maintain more static merchant information, such as a merchant identifier and MCC, in its proprietary the merchants database 306. A financial institution may use the third-party API to get merchant address, merchant social media handle, or other merchant information that may change over time.

The data stored by the merchants database 306 might be used to generate authentication questions that comprise both correct answers (e.g., based on data from the transactions database 303 indicating one or more real merchants with which a user has conducted a transaction) and false answers (e.g., based on data from the merchants database 306, which might be randomly-selected merchants where a user has not or rarely conducted a transaction). For example, a computing device may receive from merchants database 306 indications (e.g., merchant names, merchant identifiers) of different merchants. The computing device may further receive transaction data from transaction database 303 indicating one or more transactions conducted by a user. The computing device may determine one or more merchants related to a user and store a list of the merchant choices in the merchants databases 306. The list of the merchant choices may be further modified by excluding certain merchants corresponding to potentially fraudulent transactions. For example, the fraudulent transactions might be conducted by an imposer that gained access to an account of a legitimate user. As such, an authentication question may be generated based on the modified merchant choices.

The confidence database 307 may store data corresponding to one or more fraudulent transaction confidence scores that indicate a degree of confidence that one or more transactions were fraudulent. A fraudulent transaction confidence score for a particular transaction may be determined by a fraud detection algorithm, and stored in the confidence database 307 with a reference to the corresponding transaction in the transactions database 303. The confidence database 307 and the transaction database 303 may also be merged to one database (not shown in FIG. 3). For example, the fraudulent transaction confidence score might be a value between 0 to 1, where 0 indicates that there is a zero possibility that a corresponding transaction is fraudulent; 0.75 indicates a somewhat high likelihood that the corresponding transaction is fraudulent, and 1 indicates that there is 100% possibility that the corresponding transaction is fraudulent.

The authentication server 302 may use a fraud detection algorithm (e.g., one or more machine learning models) to determine a fraudulent transaction confidence score for a particular transaction. The machine learning model may be trained using training data including historic transaction records from different users and predefined fraudulent transaction confidence scores corresponding to transactions from different users. For example, the training data may comprise data indicating, for each of hundreds of different transactions, a corresponding fraudulent transaction confidence score. The machine learning model might be an unsupervised model or a supervised model. The historic transaction records may include information related to the users' transaction history, such as where the users transacted in the past, whether the transactions occurred near the users' home locations, whether the transactions occurred in the proximity with the places that the users typically transacted, the transaction amounts, the transaction times, whether the transactions were inline with the users typically spent, and the like. These information together with the predefined confidences scores may be used to train the machine learning model. The trained machine learning model may output a fraudulent transaction confidence score for a particular transaction. The trained machine learning model may also be trained to determine a generic confidence threshold applicable to various transactions from different users. For example, the generic confidence threshold may be set at 0.8, and any transactions with corresponding fraudulent transaction confidence scores equal or higher than 0.8 might be rejected as fraudulent. The rejected transactions may be labelled as fraudulent and the corresponding records may be purged from the transaction database 303.

Transaction records with a corresponding fraudulent transaction confidence score lower than a generic threshold value (e.g., 0.8) may be accepted by the fraud detection algorithm and be recorded in the transaction database 303. After the initial checking by the fraud detection algorithm, the transaction records in the transaction database 303 may still include transactions that might be potentially fraudulent. For example, certain transactions with the corresponding fraudulent transaction confidence scores falling below the 0.8 confidence threshold but above, for example, 0.6, might be initially accepted by the fraud detection algorithm, and the users might later report that one or more of these transactions as fraudulent. However, the fraud detection algorithm might not apply a lower generic confidence threshold (e.g., at 0.6) initially, because doing so may cause many more transactions being rejected and frustrate the legitimate users from using their accounts. The fraud detection algorithm may attempt to find a balance between the competing goals—to detect the fraudulent transactions as much as possible, while not to frustrate legitimate transactions too frequently. As such, due to the delay in the reporting process that certain transactions were found to be fraudulent, these transactions may be still populated into the transaction database 303. Using these transactions in an authentication question may inadvertently deny a legitimate user to her account and enable an illegitimate user to gain access to the account.

Multiple different machine learning models may be used at different times to determine fraudulent transaction confidence scores of transactions. For example, the authentication server 302 may use a second machine learning model to identify potential fraudulent transactions that had been permitted by the fraud detection algorithm (e.g., one or more first machine learning models that are used as part of the fraud detection algorithm). The second machine learning model may determine a customized confidence threshold tailored for a particular user. For example, a first user may have a first confidence threshold of 0.6 and a second user may have a second confidence threshold of 0.75. Any transactions with the corresponding fraudulent transaction confidence scores equal or above 0.6 might be identified as potentially fraudulent transactions for the first user. Any transactions with the corresponding fraudulent transaction confidence scores equal or above 0.75 might be identified as potentially fraudulent transactions for the second user. The potentially fraudulent transactions may be excluded from consideration in generating the authentication questions. Even these excluded transactions may eventually turn out to be non-fraudulent (e.g., these transactions were not reported as fraudulent by the users after a certain period of time), excluding these transactions might not negatively impact the security or the user experience of the corresponding accounts.

One or more second machine learning models may be trained to determine a customized confidence threshold for a particular user or set of users. For example, the authentication server 302 may use a trained second machine learning model to determine a customized confidence threshold tailored for a particular user (e.g., a first user). That second machine learning model may be trained using tagged training data including a history of transaction records conducted by different users, and each transaction record may be associated with a predetermined fraudulent transaction confidence score. The predetermined fraudulent transaction confidence scores indicated in the training data may be determined by a fraud detection algorithm (e.g., one or more first machine learning models used as part of a fraud detection algorithm). The tagged training data may further include recommended confidence thresholds for different users. The tagged training data may also include an indication for each transaction whether it is fraudulent. After the training process, the authentication server 302 may provide, as input to the trained second machine learning model, input data including transaction data associated with the first user and the corresponding fraudulent transaction confidence scores for the transactions conducted by the first user. The authentication server 302 may receive, as output from the trained second machine learning model, data indicating a confidence threshold associated with the first user.

Having discussed several examples of computing devices which may be used to implement some aspects as discussed further below, discussion will now turn to a method for excluding fraudulent transactions in transaction-based authentication.

Figure 4:
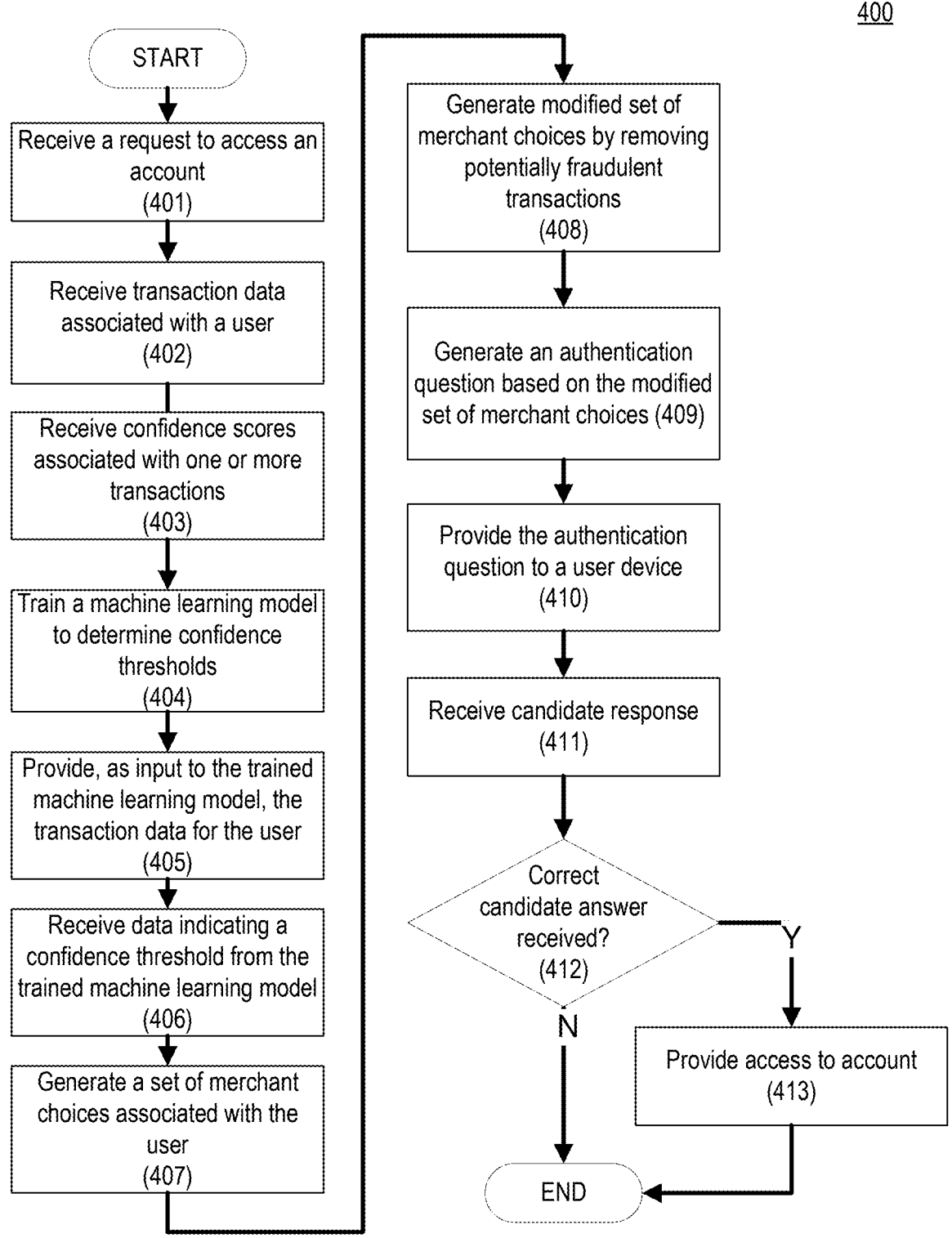
FIG. 4 depicts a flow chart comprising steps which may be performed for excluding fraudulent transactions in transaction-based authentication.

FIG. 4 illustrates an example method 400 for excluding fraudulent transactions in transaction-based authentication in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged or otherwise modified as desired.

In step 401, a computing device (e.g., authentication server 302) may receive, from a user device, a request for access to an account associated with a user. The request may be associated with access, by a user, to a website, an application, or the like. The request may additionally and/or alternatively be associated with, for example, a user device calling into an Interactive Voice Response (IVR) system or similar telephone response system. For example, the computing device may receive an indication of a request for access to an account responsive to a user accessing a log-in page, calling a specific telephone number, or the like. The request may specifically identify an account via, for example, an account number, a username, or the like. For example, a user might call an IVR system and be identified (e.g., using caller ID) by their telephone number, which might be used to query the user account database 304 for a corresponding account.

In step 402, the computing device may receive, from one or more databases, transaction data corresponding to an account of the user. The transaction data may indicate one or more transactions conducted by the user. The transaction data may be received from, e.g., the transactions database 303. For example, the transactions data may comprise transaction data related to purchases of goods and/or services made by the user. The transactions data might correspond to a period of time, such as a recent period of time (e.g., the last day, the last week, last month, the last two months, or the like). The transaction data may also indicate whether the user conducted one or more transactions with a particular merchant.

The transaction data may indicate account profile information. The account profile information may be received from, e.g., the user account database 304. For example, the account data may comprise account profile information related to, such as a billing address, a phone number or an email address. The account data may also indicate demographic data about the user such as age, gender, location, occupation, education level, income level, etc.

In step 403, the computing device may receive, from the one or more databases, one or more fraudulent transaction confidence scores associated with the corresponding transactions. The one or more fraudulent transaction confidence scores may indicate a degree of confidence, by a fraud detection algorithm, that a particular transaction was fraudulent. For example, a first transaction conducted by the user may have a fraudulent transaction confidence score of 0.7, indicating there is a 70% possibility that the first transaction might be fraudulent. As another example, a second transaction conducted by the user may have a fraudulent transaction confidence score of 0.6, indicating there is a 60% possibility that the second transaction might be fraudulent.

The computing device may use a fraud detection algorithm (e.g., one or more first machine learning models used as part of a fraud detection algorithm) to determine one or more fraudulent transaction confidence scores for a particular transaction and a generic confidence threshold. That generic confidence threshold may operate as an initial gatekeeper. For example, the first machine learning model may be implemented via the deep neural network 200 and/or the machine learning software 127. The computing device may identify any transaction with a fraudulent transaction confidence score equal or beyond the generic confidence threshold as fraudulent and deny any transaction from being authenticated. The generic fraudulent transaction confidence score may be applicable to different transactions conducted by different users. The first machine learning model may be trained using training data including historic transaction records from different users and the corresponding fraudulent transaction confidence scores. The first machine learning model might be an unsupervised model or a supervised model. The historic transaction records may include information related to the users' transaction history, such as the factors related to where the users transacted in the past, whether the transactions occurred near the users' home locations, whether the transactions occurred in the proximity with the places that the users typically transacted, the transaction amounts, the transaction times, whether the transactions were in line with the users typically spent, etc. These factors together with the predefined confidences scores may be used to train the first machine learning model. The trained first machine learning model may output a fraudulent transaction confidence score for a particular transaction. The trained first machine learning model may also be trained to determine a generic confidence threshold (e.g., 0.8) applicable to various transactions from different users. For example, any transactions with corresponding fraudulent transaction confidence scores equal or higher than 0.8 might be rejected as fraudulent, and the corresponding records might be purged from the transaction database 303.

In step 404, the computing device may train, based on a history of transaction records, one or more second machine learning models to determine recommended confidence thresholds. For example, the one or more second machine learning models may be implemented via the deep neural network 200 and/or the machine learning software 127. The second machine models may be different from the first machine learning models used in step 403. For example, the first machine learning models may be unsupervised models and the second machine learning models may be supervised models. The first machine learning models may generate a genetic confidence threshold (e.g., 0.8) that may be applicable to different transactions from different users. Any transaction with a fraudulent transaction confidence score equal or beyond this generic confidence threshold may be rejected during the authentication process. The second machine learning models may generate a customized confidence threshold (e.g., 0.6) tailored to a specific user. Different users may have different customized confidence thresholds. In some examples, the customized confidence threshold may serve as a further gatekeeper and may have a value lower than that of the generic confidence threshold.

The second machine learning models may be trained using tagged training data including a history of transaction records conducted by different users and the corresponding predetermined fraudulent transaction confidence scores. The predetermined fraudulent transaction confidence scores may be determined by the fraud detection algorithm in step 403. The history of transaction records conducted by different users may include user spending patterns, such as a number of purchases made by a particular user, a number of merchants associated with the particular user, and one or more types of merchants (e.g., the MCC) that the particular user transacted with. The second machine learning models may cluster different users based on the corresponding user types. Users in the same type may have a similar user spending pattern. For example, a first type of users might use a card to make four purchases a month, and these purchases might be related to ABC Grocery. A second type of users may each have over 50 transactions each month, and the purchases might be related to a wide range of merchants. The second machine learning models may set a relatively higher confidence threshold for the first type of users, because they tend to shop less frequently and always with the same merchant, and the chances for a fraudulent transaction to occur are relatively low. The second machine learning models may set a relatively lower confidence threshold for the second type of users, because they tend to shop more frequently and with different types of merchants, and the chances for a fraudulent transaction to occur are relatively high.

The history of transaction records may include time periods (e.g., an hour, a day, a week, a month) since the users conducted the corresponding transactions. The second machine learning models may be trained based on the time periods. For example, a first set of transactions may occur in the last day, and the second set of transactions may occur in the last month. The second machine learning model may set a relative low confidence threshold for the first set of transactions which occurred in the last day, given that the users have relatively shorter period of time to capture and report such transactions if any transaction is fraudulent. The second machine learning models may set a relative high confidence threshold for the second set of transactions which occurred in the last month, given that the users have relatively longer period of time to capture and report such transactions if any transaction is fraudulent.

The second machine learning models may be trained based on user feedback information. Certain transactions which are not identified as fraudulent by the fraud detection algorithm may still be reported as fraudulent by the users at a later time (e.g., a week later) after the fact. Based on the user feedback on whether the transactions are fraudulent, the second machine learning models may adjust the confidence threshold for a particular user. For example, the second machine learning models may set a first confidence threshold (e.g., 0.7) for the particular user. The transaction record may indicate that this user conducted five transactions T1 to T5 in the last month with the corresponding fraudulent transaction confidence scores C1=0.5, C2=0.6, C3=0.67, C4=0.75 and C5=0.55. Based on the first confidence threshold (e.g., 0.7), the second machine learning models may identify transaction T4 with a corresponding fraudulent transaction confidence score (e.g., 0.75) that satisfies the first confidence threshold. The second machine learning models may identify T4 as potentially fraudulent. The second machine learning models may adjust the first confidence threshold based on user feedback. For example, the computing device may present transactions T1-T5 to the user and ask the user to identify whether any of the transactions is fraudulent. The first confidence threshold may be adjusted to be consistent with the user's feedback. For example, if the user reports no transaction is fraudulent, the second machine learning models may increase the first confidence threshold, for example, from 0.7 to 0.8, so that no transaction would be identified as potentially fraudulent. If the user reports that T4 is fraudulent, the second machine learning models may keep the first confidence threshold at 0.7, so that T4 would be identified as potentially fraudulent. If the user reports that both T3 and T4 are fraudulent, the second machine learning models may decrease the first confidence threshold, for example, from 0.7 to 0.65, so that T3 and T4 would be identified as potentially fraudulent.

Figure 5:
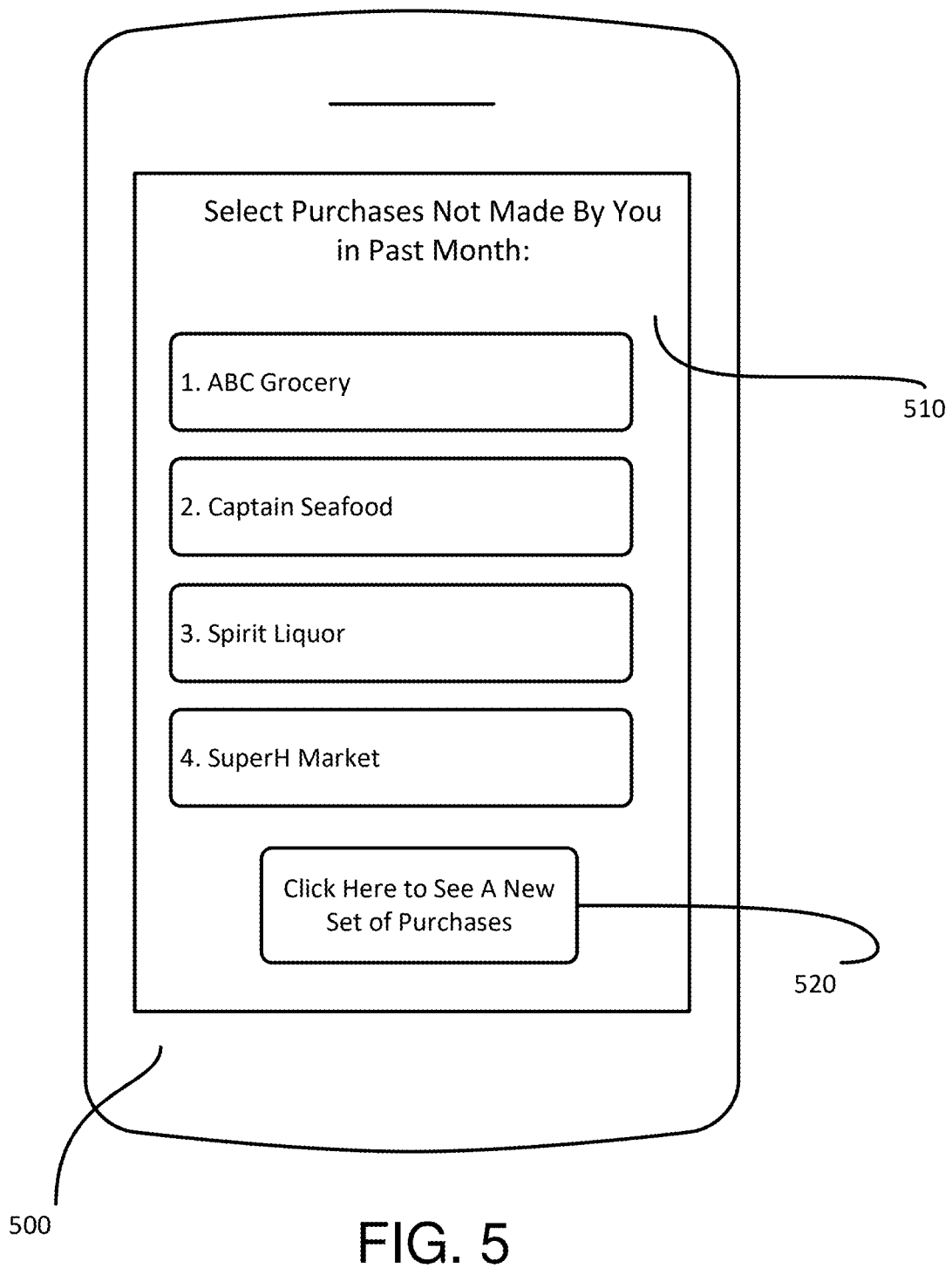
FIG. 5 depicts an example interface for a user to configure related users.

FIG. 5 depicts example interfaces for a user to provide feedback in accordance with the process described above. As illustrated in FIG. 5, the computing device may present to a user an interface 510 on a user device 500 with a list of merchants as indicated in the user's transaction record. The computing device may present the list of merchants related to transactions based on their corresponding fraudulent transaction confidence scores. For example, the computing device may select the first four transactions with the highest fraudulent transaction confidence scores to be presented to the user. The computing device may select transactions that beyond a first confidence threshold (e.g., 0.7). If there are less than four transactions that satisfy the first confidence threshold, the computing device may select additional transactions based on, for example, the recency, because if a transaction occurs in the last hour or last day, it is less likely for the user to report a fraudulent transaction before it is brought to the user's attention by presenting it on the interface 510. The computing device may select the transactions to be presented to the user based on their transaction amounts. The computing device may select the transactions to be presented to the user based on the frequency of visits. For example, if the user has not visited a merchant previously, the computing device may present this new merchant to the user for confirmation. The computing device may select the transactions to be presented to the user based on any combination of the factors above.

In the example of FIG. 5, the computing device may present a list of merchants based on transactions occurred in the past month. The user may select one or more merchants from a list comprising, for example, ABC Grocery, Captain Seafood, Spirit Liquor and SuperH Market. The computing device may use the corresponding fraudulent transaction confidence scores ABC Grocery (0.2), Captain Seafood (0.7), Spirit Liquor (0.8) and SuperH Market (0.4) as part of the tagged training data. The computing device may receive a response from the user for a selection of one or more merchants (e.g., Spirit Liquor) that the user did not make any purchase from this merchant in the past month. Optionally, after the user selects "Spirit Liquor," the computing device may present transaction detail (not shown in FIG. 5) related to the merchant such as a transaction amount and a transaction time, so that the user may confirm whether she made the purchase from Spirit Liquor. The user might not select ABC Grocery, Captain Seafood and SuperH Market, because the user recognizes them as legitimate transactions conducted by the user. The computing device may provide an option 520 for the user to view additional purchases made in the past month or past six months and provide feedback. The computing device may provide the user feedback as tagged training data to train the second machine learning model. The second machine learning model may be trained to output a recommended fraudulent transaction confidence score (e.g., 0.75) for the user.

The computing device may further fine tune the confidence thresholds based on whether users answer the authentication questions correctly. A second machine learning model may output a recommended confidence threshold for a user. The recommended confidence threshold may be used to exclude certain transactions from being used to generate the authentication questions for the user. The second machine learning model may be trained by adjusting the recommended confidence threshold for the user. In deciding whether to include a transaction in generating the authentication questions, the recommended confidence threshold may be adjusted based on whether the user answer the authentication question correctly. The computing device may automatically adjust the confidence threshold based on how well or poorly the user answered the corresponding authentication questions generated based on the transactions. For example, if a user regularly misses the authentication questions with the confidence threshold between the range of 0.6 to 0.8, the computing device may lower the confidence threshold for that user from 0.6 to 0.5 so that certain potentially fraudulent questions may be eliminated. In adjusting the confidence threshold to train the second machine learning models, the computing device may consider whether using a confidence threshold may eliminate all or a majority of the transactions for the user. For example, if the transactions associated with a user all have a fraudulent transaction confidence score between 0.65 to 0.8, setting the confidence threshold to be 0.6 would eliminate all transactions. The computing device may set the fraudulent transaction confidence score to, for example, 0.7, to avoid the situation that there would be no usable transactions to generate the authentication questions for the user. For example, the computing device may use a third machine learning model to determine whether the second machine learning model might overestimate the fraud threshold, which results in no eligible transactions to generate the authentication questions for the user. As such, the third machine learning model may be employed to evaluate the performance of the second machine learning model and fine tune the confidence threshold for the user.

In adjusting the confidence threshold to train the second machine learning models, the computing device may consider the user's previous spending pattern and to determine whether certain confidence threshold might be appropriate. For example, a first user might regularly shop at various stores and generate numerous transactions (e.g., 50 transactions) each month, while a second user might shop infrequently and generate only a few transactions (e.g., 5 transactions) each month. The computing device may adjust the confidence threshold for the first user to 0.6 and adjust the confidence threshold for the first user to 0.8, given that there are more data points to process for the first user. In the case of the second user which has fewer data points to establish a spending pattern or behavior, the computing device may increase the confidence threshold to 0.8, so that these five data points might not be excluded and would be used in generating the authentication questions. Adoringly, the computing device may consider one or more factors in tuning the confidence threshold and training the second machine learning models. The computing device may also consider all factors noted above and take a wholistic approach to consider the transactions in tuning the confidence threshold and training the second machine learning models.

The second machine learning models may be trained to determine the recommended confidence thresholds based on a combination of factors associated with a history of the transaction records, such as user types, the user spending patterns, the time periods, user feedback and available data points. The computing device may use one or more factors in a collection of factors to train the second machine learning models. The second machine learning models may be provided tagged training data that indicates the collection of factors. The computing device or the second machine learning models may initially assign a weight to each factor in the collection. For example, the second machine learning models may assign a first weight to a factor related to the user spending pattern and a second weight to a factor related to the time period. The first weight may be higher than the second weight. Given that users are generally creatures of their habits, the spending pattern is more indicative of whether a transaction is fraudulent based on whether the transaction conforms to or deviates from her spending pattern. The second machine learning models may be trained to output recommended confidence thresholds based on the weights. The weights may be adjusted and tuned based on other factors in the collection. The second machine learning models may go through several iterations to assign different weights to different factors. The second machine learning models may be trained with the appropriate weights for the factors. The trained second machine learning models may be trained to output recommended confidence thresholds for the users based on the appropriate weights.

In step 405, the computing device may provide, as input to the trained second machine learning models, input data including the transaction data associated with the particular user. The transaction data may include one or more transactions conducted by the user in a predetermined period of time. The transaction data may include a number of purchases made by the user in the predetermined period of time (e.g., in the past month). For example, the user may conduct 50 transactions in the last month. The transaction data may include a number of merchants that the user has transacted with in the past month. For example, the user may transact with 30 different merchants in the past month. The transaction data may include one or more types of merchants that the user has transacted with. For example, the user may transact with different grocery stores, coffee shops, retail stores, bookstores, restaurants, a cable company, a pet service company and a landscaping company in the past month. The transaction data may include additional information such as transaction amounts and transaction times associated the transactions conducted by the user.

In step 406, the computing device may receive, from the trained second machine learning models, output indicating a confidence threshold for the user. The trained second machine learning models may output, for example, a confidence threshold value between 0 to 1. The threshold value may be tailored specific for the user, and may be lower than the generic threshold value used by the fraud detection algorithm in step 403. The specific confidence threshold may enable the computing device to filter out transactions that were not identified by the fraud detection algorithm as fraudulent, but may still be potentially fraudulent and confusing to the user. The trained machine learning models may output the threshold based on factors discussed in step 404 and a corresponding weight for each factor associated with the transaction data.

In step 407, the computing device may determine a set of merchant choices associated with the user. The merchant choices may be generated based on the transaction history of the user in a predetermined period of time. The merchant choices may include true merchant choices (e.g., merchants that the user has transacted with) and false merchant choices (e.g., merchants that the user has not transacted with). For example, the transaction records may indicate that the user has transacted with ABC Grocery, Captain Seafood, Spirit Liquor and SuperH Market in the past month. The transaction records may indicate that the user has not transacted with Joe's Steakhouse in the past month.

In step 407, the computing device may generate a modified set of merchant choices associate with the first user by excluding one or more merchants. The computing device may retrieve transactions related to the merchants on the list of merchant choices. The computing device may retrieve the fraudulent transaction confidence scores corresponding to the transactions. The computing device may compare the fraudulent transaction confidence score with the confidence threshold for the user that is output by the second machine learning model. Based on the comparison, the computing device may identify one or more potentially fraudulent transactions with the corresponding fraudulent transaction confidence scores that satisfy the confidence threshold. The computing device may exclude one or more merchants associated with the potentially fraudulent transactions to generate a modified set of merchant choices. For example, the transaction records may indicate that the user has transacted with ABC Grocery, Captain Seafood, Spirit Liquor and SuperH Market in the past month. The computing device may compare the fraudulent transaction confidence score of each of the merchant on the list of merchant choices with the confidence threshold (e.g., 0.75). The computing device may identify that a transaction with Spirit Liquor has a fraudulent transaction confidence score 0.8, which satisfies the confidence threshold. Based on the comparison, a transaction with Spirit Liquor may be identified as potentially fraudulent. As such, the computing device may remove Spirit Liquor from the set of merchant choices. The modified set of merchant choices for the user include ABC Grocery, Captain Seafood and SuperH Market. The computing device may also remove merchants associated with the potentially fraudulent transactions from a set of false merchant choices. For example, a transaction associated with Spirit Liquor may have a fraudulent transaction confidence score of 0.8, indicating there is 80% possibility that the transaction is fraudulent, while 20% possibility that the transaction is legitimate. Due to this uncertainty, Spirit Liquor may be removed from the set of false merchant choices to minimize confusions to the legitimate user.

In step 409, the computing device may generate, based on the modified merchant choices, an authentication question for the user. The modified merchants may include true merchants that the user has transacted with in a predetermined period of time (e.g., last month). The modified merchants may include false merchants that the user has not transacted with in a predetermined period of time (e.g., last month). The authentication question may ask the user, for example, whether she has made a purchase at one or more merchants from a list of candidate merchants in the last month. The candidate merchants may include, for example, three merchants from a list of true merchants in the modified merchant choices, and one merchant from a list of false merchants in the modified merchant choices. The authentication question may ask a user, for example, to select one or more merchants from a list of candidate merchants that the user has not made a purchase at one or more merchants in the last month. The candidate merchants may include, for example, three merchants from the list of false merchants in the modified merchant choices, and one true merchant from the list of true merchants in the modified merchant choices. The candidate merchants may not include any merchant that has been excluded from the modified set of merchants (e.g., merchants related to potentially fraudulent transactions). The selected candidate merchants may be associated with relatively low fraudulent transaction confidence scores (e.g., lower than 0.4). Using candidate merchants with low fraudulent transaction confidence scores may reduce the likelihood of confusion and promote memorability, as the user may have a strong impression on the legitimate transactions conducted by herself.

In step 410, the computing device may present the authentication question. Presenting the authentication question may comprise causing one or more computing devices to display and/or otherwise output the authentication question. For example, the computing device may cause presentation, to the user, of the authentication question. Such presentation might comprise providing the authentication question in a text format (e.g., in text on a website), in an audio format (e.g., over a telephone call), or the like.

In step 411, the computing device may receive a candidate response to the authentication question. A candidate response may be any indication of a response, by a user, to the authentication question presented in step 410. For example, where an authentication question comprises a candidate merchant, the candidate response might comprise a selection of true or false for the candidate merchant. As another example, in the case of a telephone call, the candidate response might comprise an oral response to an authentication question provided using a text-to-speech system over the call.

In step 412, the computing device may determine whether the candidate answer received in step 411 is correct. Determining whether the candidate answer is correct may comprise comparing the answer to the correct answer determined as part of generating the authentication question in step 409. If the candidate answer is correct, the method 400 proceeds to step 413. Otherwise, the method 400 ends.

In step 413, the computing device may provide access to the account. For example, the computing device may provide, based on the candidate response, the user device access to the account. Access to the account might be provided by, e.g., providing a user device access to a protected portion of a website, transmitting confidential data to a user device, allowing a user to request, modify, and/or receive personal data (e.g., from the user account database 304 and/or the transactions database 303), or the like. In some examples, the computing device may provide the user access to the account when the candidate response is, for example, 100% accurate. Alternatively, or additionally, the computing device may provide the user access to the account based on the user has answered a threshold number of questions correctly (e.g., above 90%).

Figure 6B:
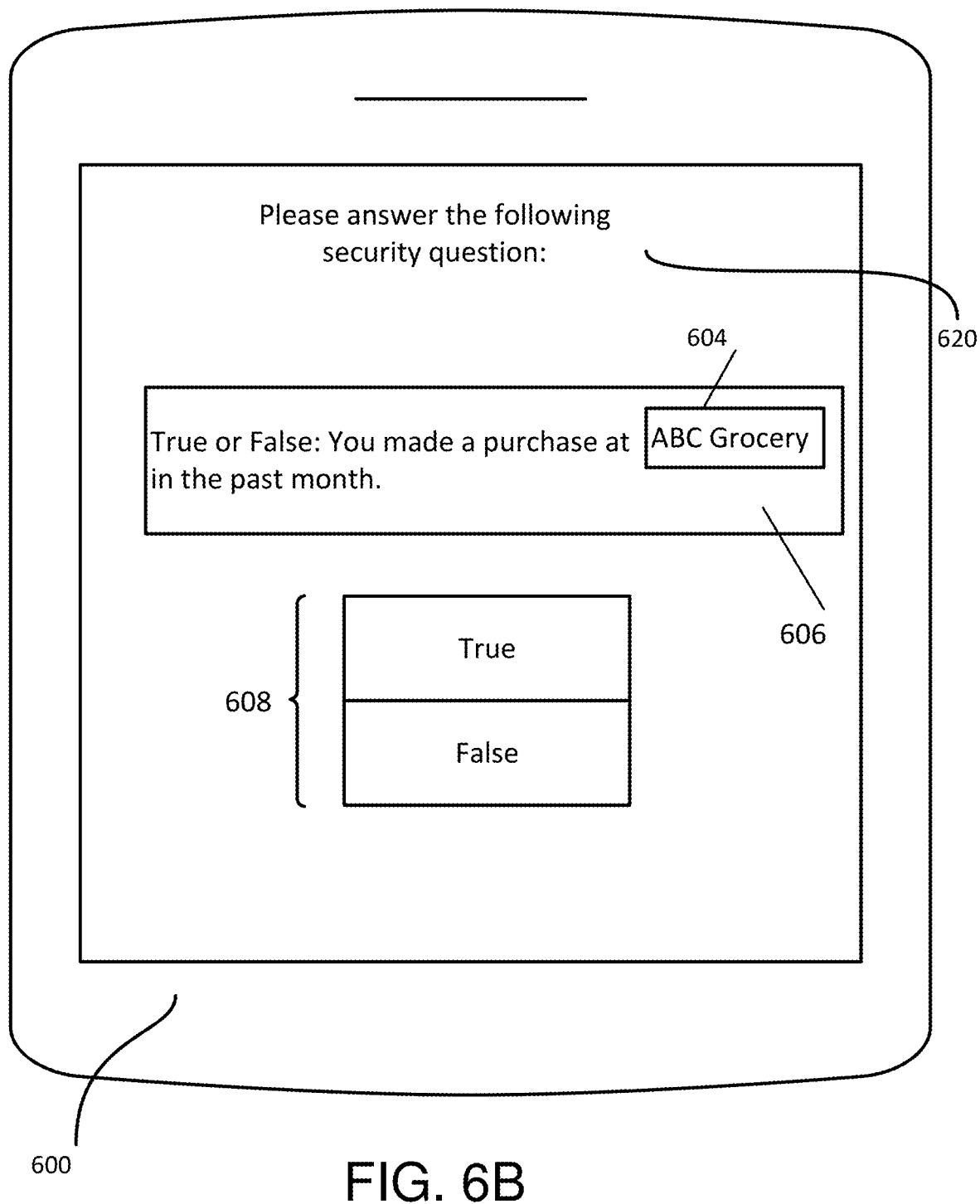
FIG. 6B depicts an example of an authentication question that may be presented to a user.

FIGS. 6A-B illustrate an example of generating an authentication question that may be presented to a user. The elements in FIGS. 6A-B are representations of various steps in the method 400 depicted in FIG. 4, such as those depicted with respect to steps 407 through 410 of the method 400. As illustrated in FIG. 6A, the computing device (e.g., authentication server 302) may determine initial merchant choices for a user based on the user's transaction history. The merchant choices might be a merchant with which the user conducted a transaction with in, for example, the past 30 days using the user's account (e.g., a "true answer" merchants may be a merchant where the user conducted a transaction using the user's financial account). The computing device may determine the initial merchant choices 601 for a user in a predetermined time period, e.g. the past 30 days. The computing device may display the corresponding fraudulent transaction confidence scores with the initial merchant choices 601. For example, the initial merchant choices 601 may include ABC Grocery (0.2), Captain Seafood (0.7), Spirit Liquor (0.8) and SuperH Market (0.4) with the corresponding fraudulent transaction confidence scores in the parentheses. The computing device may determine that Spirit Liquor is associated with a transaction with a fraudulent transaction confidence score of 0.8, which satisfies the confidence threshold of 0.75 for this user, indicating Spirit Liquor may be related to a potentially fraudulent transaction. The computing device may determine, using a trained second machine learning model, the customized confidence threshold for the user. The computing device may determine the customized confidence threshold for the user without using a machine learning model. The computing device may generate modified merchant choices 602 by excluding or removing Spirit Liquor from the set of merchant choices. To minimize confusion and reduce authentication failure for a legitimate user, the computing device may take an approach to be overly exclusive and also remove Spirit Liquor from the false merchant choices for the first user. After the computing device exclude or remove the potentially fraudulent transactions, the modified merchant choices 602 include a subset of the initial choices: ABC Grocery, Captain Seafood and SuperH Market.

The authentication question 620 may be generated and presented on user device 600 in FIG. 6B based on the described herein for reducing confusion and increasing memorability with respect to presented merchant choices. For purposes of illustration, the authentication question 620 is illustrated as an authentication question based on modified merchant choices 602 in FIG. 6A. The authentication question 620 may include a prompt 606. The prompt may include a merchant identifier 604. The authentication question 620 may further include a set of possible answers 608 (e.g., a manner for the user to answer True ("T") or False ("F") in response to the prompt 606). The authentication question 620 may be generated based on the modified merchant choices 602. By generating the authentication question 620 based on the modified merchant choices 602, the computing device may avoid presenting an authentication question that may confuse the user by excluding data (e.g., a merchant name) related to potentially fraudulent transactions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
    one or more processors; and
    memory storing instructions that, when executed by the one or more processors, cause the computing device to:
        receive, from a user device, a request for access to a first account associated with a first user;
        provide, as input to a machine learning model, input data comprising first transaction data corresponding to the first account and one or more fraudulent transaction confidence scores indicating a degree of confidence, by a fraud detection algorithm, that a particular transaction, of one or more transactions in the first transaction data, was fraudulent;

receive, as output from the machine learning model, data indicating a confidence threshold associated with the first user;

determine, based on the first transaction data and based on the confidence threshold, one or more merchant choices, wherein each of the one or more merchant choices is associated with a corresponding fraudulent transaction confidence score that satisfies the confidence threshold;

generate, based on the first transaction data, a set of modified merchant choices by excluding the one or more merchant choices;

generate an authentication question comprising at least one merchant choice from the set of modified merchant choices, wherein the set of modified merchant choices for generating the authentication question comprise false merchants that the first user has not transacted with in a predetermined period of time;

generate, based on the first transaction data and the set of modified merchant choices, a correct answer to the authentication question;

provide the authentication question to the user device;

receive, from the user device, a response to the authentication question; and grant the user device access to the first account based on comparing the response to the authentication question to the correct answer.

2. The computing device of claim 1, wherein the instructions, when executed by the one or more processors, cause the computing device to:

train, based on a history of transaction records, the machine learning model to determine recommended confidence thresholds, wherein the history of transaction records indicates transactions conducted by a plurality of different users, and wherein each transaction indicated by the history of transaction records is associated with a predetermined fraudulent transaction confidence score.

3. The computing device of claim 1, wherein the instructions, when executed by the one or more processors, cause the computing device to:

determining, based on the first transaction data comprising a transaction history associated with the first account, a first set of merchants that the first user has transacted with in the predetermined period of time; and generating the set of modified merchant choices by excluding, from the first set of merchants, the one or more merchant choices each having the corresponding fraudulent transaction confidence score that satisfies the confidence threshold.

4. The computing device of claim 1, wherein the instructions, when executed by the one or more processors, cause the computing device to:

determining, based on the first transaction data comprising a transaction history associated with the first account, a second set of false merchants that the first user has not transacted with in the predetermined period of time; and generating the set of modified merchant choices by including one or more false merchants from the second set of false merchants.

5. The computing device of claim 1, wherein the instructions, when executed by the one or more processors, cause the computing device to:

receive, from one or more databases, the first transaction data corresponding to the first account and the one or more fraudulent transaction confidence scores associated with the first account.

6. The computing device of claim 1, wherein the instructions, when executed by the one or more processors, cause the computing device to:

receive user feedback information indicating whether the one or more transactions in the first transaction data are fraudulent; and modify, using the machine learning model and based on the user feedback information, the confidence threshold associated with the first user.

7. The computing device of claim 1, wherein the input data further comprises a user spending pattern that includes one or more of:

a number of purchases made by the first user, a number of merchants associated with the first user, or one or more types of merchants associated with the first user.

8. The computing device of claim 1, wherein the input data further comprises one or more time periods associated with one or more transactions in the first transaction data.

9. The computing device of claim 1, wherein the instructions, when executed by the one or more processors, cause the computing device to:

determine, using a second machine learning model different from the machine learning model, the one or more fraudulent transaction confidence scores, wherein the machine learning model is trained to output fraudulent transaction confidence scores using second training data that comprises a history of fraudulent transaction confidence scores corresponding to a history of different transactions.

10. The computing device of claim 9, wherein the second machine learning model comprises an unsupervised model, and wherein the machine learning model comprises a supervised model.

11. The computing device of claim 1, wherein the confidence threshold is lower than a generic confidence threshold applied to one or more different accounts.

12. The computing device of claim 1, wherein the correct answer comprises an answer correctly identifies that the first user has transacted with a particular merchant in the predetermined period of time.

13. The computing device of claim 1, wherein the correct answer comprises an answer correctly identifies that the first user has not transacted with a particular merchant in the predetermined period of time.

14. A method comprising:

receiving, from a user device, a request for access to a first account associated with a first user;

providing, as input to a machine learning model, input data comprising first transaction data corresponding to the first account and one or more fraudulent transaction confidence scores indicating a degree of confidence, by a fraud detection algorithm, that a particular transaction, of one or more transactions in the first transaction data, was fraudulent;

receiving, as output from the machine learning model, data indicating a confidence threshold associated with the first user;

determining, based on the first transaction data and based on the confidence threshold, one or more merchant choices, wherein each of the one or more merchant choices is associated with a corresponding fraudulent transaction confidence score that satisfies the confidence threshold;

generating, based on the first transaction data, a set of modified merchant choices by excluding the one or more merchant choices;

generating an authentication question comprising at least one merchant choice from the set of modified merchant choices, wherein the set of modified merchant choices for generating the authentication question comprise false merchants that the first user has not transacted with in a predetermined period of time;

generating, based on the first transaction data and the set of modified merchant choices, a correct answer to the authentication question;

providing the authentication question to the user device;

receiving, from the user device, a response to the authentication question; and granting the user device access to the first account based on comparing the response to the authentication question to the correct answer.

15. The method of claim 14, further comprising:

training, based on a history of transaction records, the machine learning model to determine recommended confidence thresholds, wherein the history of transaction records indicates transactions conducted by a plurality of different users, and wherein each transaction indicated by the history of transaction records is associated with a predetermined fraudulent transaction confidence score.

16. The method of claim 14, wherein generating the set of modified merchant choices comprises:

determining, based on the first transaction data comprising a transaction history associated with the first account, a first set of merchants that the first user has transacted with in the predetermined period of time; and generating the set of modified merchant choices by excluding, from the first set of merchants, the one or more merchant choices each having the corresponding fraudulent transaction confidence score that satisfies the confidence threshold.

17. The method of claim 14, wherein generating the set of modified merchant choices comprises:

determining, based on the first transaction data comprising a transaction history associated with the first account, a second set of false merchants that the first user has not transacted with in the predetermined period of time; and generating the set of modified merchant choices by including one or more false merchants from the second set of false merchants.

18. The method of claim 14, further comprising:

receiving user feedback information indicating whether the one or more transactions in the first transaction data are fraudulent; and modifying, using the machine learning model and based on the user feedback information, the confidence threshold associated with the first user.

19. One or more non-transitory computer-readable media storing instructions that, when executed by one or more processors, cause a computing device to:

receive, from a user device, a request for access to a first account associated with a first user;

provide, as input to a machine learning model, input data comprising first transaction data corresponding to the first account and one or more fraudulent transaction confidence scores indicating a degree of confidence, by a fraud detection algorithm, that a particular transaction, of one or more transactions in the first transaction data, was fraudulent;

receive, as output from the machine learning model, data indicating a confidence threshold associated with the first user;

determine, based on the first transaction data and based on the confidence threshold, one or more merchant choices, wherein each of the one or more merchant choices is associated with a corresponding fraudulent transaction confidence score that satisfies the confidence threshold;

generate, based on the first transaction data, a set of modified merchant choices by excluding the one or more merchant choices;

generate an authentication question comprising at least one merchant choice from the set of modified merchant choices, wherein the set of modified merchant choices for generating the authentication question comprise false merchants that the first user has not transacted with in a predetermined period of time;

generate, based on the first transaction data and the set of modified merchant choices, a correct answer to the authentication question;

provide the authentication question to the user device;

receive, from the user device, a response to the authentication question; and grant the user device access to the first account based on comparing the response to the authentication question to the correct answer.

20. The computer-readable media of claim 19, wherein the set of modified merchant choices comprise merchants that the first user has transacted with in the predetermined period of time.

* * * * *